United States Patent Office

Re. 24,036
Reissued July 12, 1955

24,036

PROCESS FOR THE PRODUCTION OF ALKYL AROMATIC HYDROPEROXIDES

Michel Marius Mosnier and André Fournet, Lyon, France, assignors to Societe des Usines Chimiques Rhone-Poulenc, Paris, France No Drawing. Original No. 2,681,937, dated June 22, 1954, Serial No. 268,682, January 28, 1952. Application for reissue February 14, 1955, Serial No. 488,178

12 Claims. (Cl. 260—610)

Matter enclosed in heavy brackets [ ] appears in the original patent but forms no part of this reissue specification; matter printed in italics indicates the additions made by reissue.

This invention is for improvements in or relating to the production of the hydroperoxides of cumene and its homologues. More particularly, this invention is concerned with the conversion of cumene and homologous alkyl-aromatic hydrocarbons into the corresponding hydroperoxides by oxidation. According to the literature, this oxidation can be effected with excellent yield by treatment of the hydrocarbon with oxygen at 85° C.

It is an object of the present invention to speed up the aforesaid oxidation reaction without detriment to the yield or quality of the desired oxidation product by employing a novel catalyst for the reaction. Further objects will appear from the following description.

According to the present invention, the oxidation of cumene and other homologous alkyl-aromatic hydrocarbons such as p-cymene, di-isopropyl benzene, isobutyl benzene (i. e. a-methyl-n-propyl benzene) and ethyl benzene by means of oxygen or an oxygen-containing gas such as air, is effected in the presence as catalyst of a member of the class consisting of alkali and alkaline-earth metal formates, oxalates and benzoates.

The proportion of catalyst employed may vary within fairly wide limits depending to some extent upon the operating conditions chosen, the optimum amount being determinable by simple preliminary test. It is usually advantageous to introduce the catalyst in portions during the course of the operation.

The oxidation of the aforesaid hydrocarbons in the presence of a catalyst in accordance with the present invention is preferably carried out under the conditions generally adopted heretofore in the preparation of the hydroperoxides of hydrocarbons. More especially, and in conformity with a common practice in oxidation of this nature, there may be added at the very commencement of the process a small quantity of a hydroperoxide for the purpose of initiating the reaction. This hydroperoxide may be, for example, the hydroperoxide of the hydrocarbon to be oxidised, obtained from a prior operation.

The following examples illustrate methods of carrying the invention into effect.

EXAMPLE I 220 litres of air per hour are passed under a pressure of 12 kg. and at a temperature of 110° C. into 2700 cc. of cumene, to which 68 g. of pure cumene hydroperoxide have been added in order to initiate the reaction. In a parallel experiment, 2 g. of finely divided sodium formate are added at the commencement, and a further 1 g. thereof is added at the end of each successive hour.

A small sample is taken every hour, and the hydroperoxide titer is determined therefrom by iodometry.

The results are given in the following table, which shows the weights expressed in grams per 100 cc. of cumene hydroperoxide present at a given time (column A) and former per hour (column B) respectively.

| Reaction Time in Hours | Experiment without formate | | Experiment with formate | |
|---|---|---|---|---|
| | A | B | A | B |
| 0 | 2.53 | ---------- | 2.53 | ---------- |
| 1 | 5.38 | 2.85 | 7.37 | 4.84 |
| 2 | 7.71 | 2.33 | 14.03 | 6.66 |
| 3 | 10.07 | 2.36 | 20.78 | 6.75 |
| 4 | 11.68 | 1.71 | 28.25 | 7.46 |
| 4½ | ---------- | ---------- | 31.64 | 7.78 |
| 5 | 12.39 | 0.71 | 35.77 | 8.26 |

It will be seen from the foregoing table that, in the same period of time, three times as much hydroperoxide is obtained in the presence of formate as in the absence of formate. It will also be noted that the hourly production without formate reaches a maximum of 2.85% after one hour and falls to 0.71% at the fifth hour, whereas in the presence of formate the hourly production is 4.84% at the end of the first hour and progressively increases to 8.26% at the end of the fifth hour.

If the respective purities of the hydroperoxide obtained for substantially corresponding yields, that is to say, for example, after five hours without formate and after two hours with formate, are compared by determination of the percentage of by-products obtained, it is found that the product prepared without formate has a purity of 91.4%, that is to say, it contains 8.6% of by-products, while the product obtained with formate has a purity of 94%, that is to say it contains only 6% of by-products.

EXAMPLE II

The operation of Example I is repeated, but at atmospheric pressure and with an air supply of 180 litres per hour. In the experiment with sodium formate, 1 g. of sodium formate is added at the commencement and a further 0.5 g. per hour is added in at the end of each successive hour.

The following table gives a summary of the experiments:

| Reaction Time in Hours | Experiment without formate | | Experiment with formate | |
|---|---|---|---|---|
| | A | B | A | B |
| 0 | 3.2 | ---------- | 3.2 | ---------- |
| 1 | 5.3 | 2.0 | 5.7 | 2.5 |
| 2 | 6.7 | 1.4 | 8.0 | 2.3 |
| 3 | 8.6 | 1.9 | 10.7 | 2.7 |
| 4 | 10.4 | 1.8 | 14.3 | 3.6 |
| 5 | 12.5 | 2.1 | 18.0 | 3.7 |
| 6 | 14.2 | 1.7 | 22.8 | 4.8 |
| 7 | 16.0 | 1.8 | 27.5 | 4.6 |
| 8 | 17.8 | 1.8 | ---------- | ---------- |
| 9 | 19.5 | 1.7 | ---------- | ---------- |
| 10 | 21.4 | 1.9 | ---------- | ---------- |
| 11 | 22.4 | 1.0 | ---------- | ---------- |
| 12 | 23.1 | .07 | ---------- | ---------- |

The hourly average yield in the experiment without formate is 1.66%, while the average yield in the presence of formate attains 3.47%.

The purity of the hydroperoxide obtained without formate after twelve hours is 86%, while in the presence of formate it is 93% after seven hours. It will, therefore, be seen that for a product prepared in the presence of sodium formate a purer product, containing half the quantity of by-products, was obtained in scarcely more than half the time.

EXAMPLE III

The operation of Example I is repeated, but with oxygen instead of air. In the experiment with sodium formate, 2 g. are added at the start, and a further 1 g. is added after the end of the first and second hours respectively and a further 0.5 g. at the end of every successive hour thereafter. Supply of oxygen 60 litres per hour.

| Reaction Time in Hours | Experiment without formate | | Experiment with formate | |
|---|---|---|---|---|
| | A | B | A | B |
| 0 | 3.2 | ---------- | 2.5 | ---------- |
| 1 | 5.8 | 2.6 | 4.8 | 2.3 |
| 2 | 7.4 | 1.6 | 8.3 | 3.5 |
| 3 | 9.1 | 1.7 | 13.6 | 5.3 |
| 4 | 11.0 | 1.9 | 20.1 | 6.5 |
| 5 | 12.7 | 1.7 | 28.2 | 8.1 |
| 6 | 14.3 | 1.6 | 36.1 | 7.9 |
| 7 | 16.1 | 1.8 | ---------- | ---------- |
| 8 | 17.2 | 1.1 | ---------- | ---------- |

The average hourly yield without formate is 1.74% and with formate 5.59%.

The purity of the hydroperoxide of the 17.2% solution obtained after 8 hours without formate is 90.5%, and the purity of the hydroperoxide of the 20.1% solution obtained after 4 hours with formate (chosen to provide a more accurate comparison) is 93.5%. Therefore, for a comparable proportion of hydroperoxide, 50% more of by-products were obtained in the absence of formate.

EXAMPLE IV

In this example, the cumene is employed in the form of a suspension in water. 827 parts of cumene, 51.5% parts of a 35.5% solution of cumene hydroperoxide in cumene and 1000 parts of water (all the parts being parts by volume) are introduced into the oxidation vessel. The operation is carried out at 85° C. and eleven parts by volume of oxygen per hour are introduced. The quantity of sodium formate added corresponds to 1.5% of the water added.

| Reaction Time in Hours | Experiment without formate | | Experiment with formate | |
|---|---|---|---|---|
| | A | B | A | B |
| 0 | 2.3 | ---------- | 2.3 | ---------- |
| 4 | 4.3 | 0.5 | 4.8 | 0.6 |
| 8 | 7.45 | 0.8 | 9.2 | 1.1 |
| 11 | 9.8 | 0.8 | 13.9 | 1.5 |
| 14 | 12.3 | 0.8 | 18.1 | 1.4 |

The hourly yield of hydroperoxide without formate is 0.71% and with sodium formate it is 1.13%.

The purity of the product obtained without formate is 90% and that of the product obtained in the presence of formate is 91.5%.

EXAMPLE V

The operation is the same as in Example III but the sodium formate is replaced by the same quantities of calcium formate.

| Reaction Time in Hours | Experiment without formate | | Experiment with formate | |
|---|---|---|---|---|
| | A | B | A | B |
| 0 | 3.2 | ---------- | 3.2 | ---------- |
| 2 | 7.4 | 2.1 | 9.8 | 3.3 |
| 4 | 11.0 | 1.8 | 18.4 | 4.3 |
| 6 | 14.3 | 1.65 | 27.1 | 4.35 |
| 8 | 17.2 | 1.45 | 35.4 | 4.15 |

The average hourly yield without formate is 1.74%, and in the presence of calcium formate it is 4%.

The purity of the product prepared without formate is 90%. The purity of the product of twice the concentration, prepared in the presence of calcium formate, is 93%.

EXAMPLE VI 220 litres of air are bubbled under a pressure of 12 kg. into 2700 cc. of cumene heated at 110° C., to which 68 g. of cumene hydroperoxide have been added in order to eliminate the period of induction.

A first experiment, in which no other addition is made, will serve for reference purposes.

In a second experiment, 1 g. of finely divided sodium oxalate is added at the commencement and a further 1 g. is added after the end of each of the first three hours.

In a third experiment, 2 g. of finely divided calcium oxalate are added at the commencement, a further 1 g. after the end of the first and second hours and a further 0.5 g. after the end of the third and fourth hours, respectively.

In a fourth experiment, 2 g. of finely divided sodium benzoate are added at the commencement and a further 5 g. after each of the first four hours, respectively.

A small sample is taken every hour, and the hydroperoxide titer is determined therefrom by iodometry.

At the end of the experiment, unchanged cumene is removed and the hydroperoxide titer of the product obtained is determined. The complement to 100 of the figure thus obtained indicates the percentage of by-products formed.

The results are given in the following table, the last lines of which indicate the purity of the hydroperoxide obtained and the percentage of by-products.

| Reaction Time in Hours | Without catalyst | | With sodium oxalate | | With calcium oxalate | | With sodium benzoate | |
|---|---|---|---|---|---|---|---|---|
| | A | B | A | B | A | B | A | B |
| 0 | 2.5 | ------ | 2.5 | ------ | 2.5 | ------ | 2.5 | ------ |
| 1 | 5.4 | 2.9 | 6.1 | 3.6 | 7.1 | 4.6 | 6.7 | 4.2 |
| 2 | 7.7 | 2.3 | 9.7 | 3.6 | 11.9 | 4.8 | 12.4 | 5.7 |
| 3 | 10.1 | 2.4 | 14.3 | 4.6 | 16.8 | 4.9 | 18.2 | 5.8 |
| 4 | 11.7 | 1.6 | 18.9 | 4.6 | 22.0 | 5.2 | 24.8 | 6.6 |
| 5 | 12.4 | 0.7 | 23.6 | 4.7 | 27.3 | 5.3 | 32.4 | 7.6 |
| Titer | 91.0% | | 93% | | 92.7% | | 92.0% | |
| By-products | 9% | | 7% | | 7.3% | | 8.0% | |

It will be seen from this table, that, in the presence of the catalysts, the speed of oxidation is from two to three times the speed obtained without catalyst, and that the quantity of by-products is smaller than is the case in the experiment without catalyst.

EXAMPLE VII 600 cc. of p-cymene containing 5 g. of 68% p-cymene hydroperoxide to eliminate the period of induction are mixed with 3 g. of sodium formate. 20 litres of oxygen per hour are passed at 120° C. into the liquid for seven hours. A solution of p-cymene containing 16% of p-cymene hydroperoxide is obtained. The small quantity of isopropylbenzoic acid simultaneously formed during the oxidation is separated by washing with a dilute solution of sodium carbonate. The yield of p-cymene hydroperoxide is from 80% to 85% calculated on the weight of p-cymene consumed, the remaining percentage consisting of isopropylbenzoic acid, dimethyl-p-methylphenylcarbinol and p-methylacetophenone.

EXAMPLE VIII

Into 250 cc. of α-methyl-n-propyl benzene containing 5 g. of α-methyl-n-propyl benzene hydroperoxide and 1 g. of sodium formate are passed 10 litres of oxygen per hour at 110° C. for 17 hours. A 14.9% solution of α-methyl-n-propyl benzene hydroperoxide in α-methyl-n-propyl benzene is obtained.

The yield of hydroperoxide is from 80% to 85% calculated on the quantity of α-methyl-n-propyl benzene consumed.

We claim:

1. Process for the production of alkyl-aromatic hydroperoxides by the oxidation of cumene and homologous alkyl-aromatic hydrocarbons in which at least one alkyl substituent [group is a tertiary alkyl group and contains more than one carbon chain, the tertiary carbon atom being attached directly] *containing more than 2 carbon atoms has one hydrogen atom attached to the carbon atom which is directly attached* to the aromatic nucleus, which comprises bringing the said hydrocarbon into contact with oxygen at elevated temperature in the presence of a catalyst selected from the class consisting of the formates, oxalates and benzoates of the alkali metals and alkaline earth metals.

2. Process for the production of alkyl-aromatic hydroperoxides which comprises bringing a member of the class consisting of cumene, p-cymene, di-isopropyl benzene and α-methyl-n-propyl benzene into contact with oxygen at elevated temperature in the presence of a catalyst selected from the class consisting of the formates, oxalates anad benzoates of the alkali metals and alkaline earth metals and in the presence of a hydroperoxide.

3. Process for the production of alkyl-aromatic hydroperoxides by the oxidation of cumene and homologous alkyl-aromatic hydrocarbons in which at least one alkyl substituent [group is a tertiary alkyl group and contains more than one carbon atom, the tertiary carbon atom being attached directly] *containing more than 2 carbon atoms has one hydrogen atom attached to the carbon atom which is directly attached* to the aromatic nucleus, which comprises bringing the said hydrocarbon into contact with oxygen at elevated temperature in the presence of sodium formate as catalyst.

4. Process for the production of alkyl-aromatic hydroperoxides by the oxidation of cumene and homologous alkyl-aromatic hydrocarbons in which at least one alkyl substituent [group is a tertiary alkyl group and contains more than one carbon atom, the tertiary carbon atom being attached directly] *containing more than 2 carbon atoms has one hydrogen atom attached to the carbon atom which is directly attached* to the aromatic nucleus, which comprises bringing the said hydrocarbon into contact with oxygen at elevated temperature in the presence of calcium formate as catalyst.

5. Process for the production of alkyl-aromatic hydroperoxides by the oxidation of cumene and homologous alkyl-aromatic hydrocarbons in which at least one alkyl substituent [group is a tertiary alkyl group and contains more than one carbon atom, the tertiary carbon atom being attached directly] *containing more than 2 carbon atoms has one hydrogen atom attached to the carbon atom which is directly attached* to the aromatic nucleus, which comprises bringing the said hydrocarbon into contact with oxygen at elevated temperature in the presence of sodium oxalate as catalyst.

6. Process for the production of alkyl-aromatic hydroperoxides by the oxidation of cumene and homologous alkyl-aromatic hydrocarbons in which at least one alkyl substituent [group is a tertiary alkyl group and contains more than one carbon atom, the tertiary carbon atom being attached directly] *containing more than 2 carbon atoms has one hydrogen atom attached to the carbon atom which is directly attached* to the aromatic nucleus, which comprises bringing the said hydrocarbon into contact with oxygen at elevated temperature in the presence of calcium oxalate as catalyst.

7. Process for the production of alkyl-aromatic hydroperoxides by the oxidation of cumene and homologous alkyl-aromatic hydrocarbons in which at least one alkyl substituent [group is a tertiary alkyl group and contains more than one carbon atom, the tertiary carbon atom being attached directly] *containing more than 2 carbon atoms has one hydrogen atom attached to the carbon atom which is directly attached* to the aromatic nucleus, which comprises bringing the said hydrocarbon into contact with oxygen at elevated temperature in the presence of sodium benzoate as catalyst.

8. Process for the production of alkyl-aromatic hydroperoxides which comprises bringing a member of the class consisting of cumene, p-cymene, di-isopropyl benzene and α-methyl-n-propyl benzene into contact with oxygen at elevated temperature in the presence of a hydroperoxide and of sodium formate as catalyst.

9. Process for the production of alkyl-aromatic hydroperoxides which comprises bringing a member of the class consisting of cumene, p-cymene, di-isopropyl benzene and α-methyl-n-propyl benzene into contact with oxygen at elevated temperature in the presence of a hydroperoxide and of calcium formate as catalyst.

10. Process for the production of alkyl-aromatic hydroperoxides which comprises bringing a member of the class consisting of cumene, p-cymene, di-isopropyl benzene and α-methyl-n-propyl benzene into contact with oxygen at elevated temperature in the presence of a hydroperoxide and of sodium oxalate as catalyst.

11. Process for the production of alkyl-aromatic hydroperoxides which comprises bringing a member of the class consisting of cumene, p-cymene, di-isopropyl benzene and α-methyl-n-propyl benzene into contact with oxygen at elevated temperature in the presence of a hydroperoxide and of calcium oxalate as catalyst.

12. Process for the production of alkyl-aromatic hydroperoxides which comprises bringing a member of the class consisting of cumene, p-cymene, di-isopropyl benzene and α-methyl-n-propyl benzene into contact with oxygen at elevated temperature in the presence of a hydroperoxide and of sodium benzoate as catalyst.

References Cited in the file of this patent or the original patent

UNITED STATES PATENTS

| | | |
|---|---|---|
| 2,547,938 | Hall et al. | Apr. 10, 1951 |
| 2,548,435 | Lorand et al. | Apr. 10, 1951 |